United States Patent
Wennstrom et al.

(10) Patent No.: US 8,331,305 B2
(45) Date of Patent: Dec. 11, 2012

(54) METHOD, APPARATUS AND SYSTEM FOR DETERMINING RESOURCE INDICES

(75) Inventors: Mattias Wennstrom, Uppsala (SE); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/267,159

(22) Filed: Oct. 6, 2011

(65) Prior Publication Data
US 2012/0026966 A1 Feb. 2, 2012

Related U.S. Application Data

(63) Continuation of application No. 13/094,359, filed on Apr. 26, 2011, which is a continuation of application No. PCT/CN2008/072937, filed on Nov. 4, 2008.

(51) Int. Cl.
*H04W 4/00* (2009.01)
(52) U.S. Cl. ........ 370/329; 370/431; 370/345; 455/509; 455/450
(58) Field of Classification Search .................. None
See application file for complete search history.

(56) References Cited

U.S. PATENT DOCUMENTS

| | | | |
|---|---|---|---|
| 7,626,963 B2 | 12/2009 | Patel et al. | |
| 7,881,262 B2 | 2/2011 | Shousterman | |
| 2003/0028763 A1 | 2/2003 | Malinen et al. | |
| 2003/0147537 A1 | 8/2003 | Jing et al. | |
| 2003/0235305 A1 | 12/2003 | Hsu | |
| 2005/0025091 A1 | 2/2005 | Patel et al. | |
| 2005/0232429 A1 | 10/2005 | Chowdhury et al. | |
| 2008/0178269 A1 | 7/2008 | Kim et al. | |
| 2008/0205348 A1 | 8/2008 | Malladi | |
| 2008/0232325 A1* | 9/2008 | Mehta et al. | 370/332 |
| 2008/0311942 A1* | 12/2008 | Kim et al. | 455/509 |
| 2009/0185691 A1 | 7/2009 | Falk et al. | |
| 2009/0201863 A1* | 8/2009 | Pi | 370/329 |
| 2009/0303978 A1* | 12/2009 | Pajukoski et al. | 370/345 |

FOREIGN PATENT DOCUMENTS

| | | |
|---|---|---|
| CN | 1714560 A | 12/2005 |
| EP | 1959706 A2 | 8/2008 |
| WO | WO 2005/101793 A1 | 10/2005 |
| WO | 2008085000 A1 | 8/2007 |
| WO | WO 2007/094648 A1 | 8/2007 |
| WO | 2007148710 A1 | 12/2007 |
| WO | WO 2007/148710 A1 | 12/2007 |

OTHER PUBLICATIONS

Corresponding U.S. Appl. No. 13/094,359 (Oct. 18, 2011).
International Search Report in corresponding PCT Application No. PCT/CN2008/072937 (Aug. 13, 2009).
Written Opinion of the International Searching Authority in corresponding PCT Application No. PCT/CN2008/072937 (Aug. 13, 2009).

(Continued)

*Primary Examiner* — Kibrom T Hailu

(57) ABSTRACT

The present invention relates to a method, apparatus and system for determining resource indices in a wireless communication system, which explores and implements for at least two control channel elements (CCEs) for a user equipment (UE), maps the CCEs to at least two resource indices for the UE according to a predetermined mapping rule. It can determine multiple resource indices to a UE implicitly according to some embodiments of the present invention.

13 Claims, 8 Drawing Sheets

OTHER PUBLICATIONS

"3GPP TS 36.211—3rd Generation Partnership Project; Technical Specification Group Radio Access Network; Evolved Universal Terrestrial Radio Access (E-UTRA); Physical Channels and Modulation (Release 8)," May 2008, Version 8.3.0, $3^{rd}$ Generation Partnership Project, Valbonne, France.

"3GPP TS 36.211—3rd Generation Partnership Project; Technical Specification Group Radio Access Network; Evolved Universal Terrestrial Radio Access (E-UTRA); Physical Channels and Modulation (Release 8)," Sep. 2008, Version 8.4.0, $3^{rd}$ Generation Partnership Project, Valbonne, France.

"3GPP TS 36.213—3rd Generation Partnership Project; Technical Specification Group Radio Access Network; Evolved Universal Terrestrial Radio Access (E-UTRA); Physical layer procedures (Release 8)," Sep. 2008, Version 8.4.0, $3^{rd}$ Generation Partnership Project, Valbonne, France.

Corresponding U.S. Appl. No. 13/094,359 (Oct. 5, 2011).

Written Opinion of the International Searching Authority in corresponding PCT Application No. PCT/CN2007/070287 (Oct. 25, 2007).

International Searching Authority in corresponding PCT Application No. PCT/CN2007/070287 (Oct. 25, 2007).

"WiMAX Forum Network Architecture (Stage 3: Detailed Protocols and Procedures)," Release 1.1.1, Sep. 12, 2007, WiMAX Forum Proprietary, Beaverton, Oregon.

First Office Action of corresponding Chinese Patent Application No. 200880131733.1, Jan. 11, 2012, and English translation thereof, 7 pages total.

Second Office Action of corresponding Chinese Patent Application No. 200880131733.1, Feb. 2, 2012, and English translation thereof, 7 pages total.

Huawei, "Mapping Relation between UL ACK/NACK and DL CCE," 3GPP TSG-RAN-WG1 #52, R1-081028, Sorrento, Italy, Feb. 11-15, 2008, 6 pages total.

European search report of corresponding European Patent Application No. 08877928.5, mailed on Jul. 6, 2012, 6 pages total.

Samsung, 3GPP TSG RAN WG1 Meeting #51 R1-074788: "Slot-level UL ACK/NACK cyclic shift/orthogonal cover remapping," Jeju, Korea, dated Nov. 5-9, 2007, 6 pages total.

Huawei, 3GPP TSG RAN WG1 Meeting #51 bis R1-080117: "Slot-based cyclic shift and orthogonal cover re-mapping for UL ACK/NACK," Sevilla, Spain, dated Jan 14-18, 2008, 6 pages total.

* cited by examiner

METHOD, APPARATUS AND SYSTEM FOR DETERMINING RESOURCE INDICES

CROSS-REFERENCE TO RELATED APPLICATION

This application is a continuation of U.S. application Ser. No. 13/094,359, filed on Apr. 26, 2011, which is a continuation of International Application No. PCT/CN2008/072937, filed on Nov. 4, 2008, both of which are hereby incorporated by reference in their entireties.

FIELD OF INVENTION

The present invention relates to a wireless communication field, especially relates to a method, apparatus and system for determining resource indices.

BACKGROUND OF THE INVENTION

It is previously known that to enable coherent demodulation of acknowledgement (ACK/NACK) signals from multiple users in the uplink of a communication system, a demodulation reference signal (DRS) is allocated to each of the user equipments (UE). The DRS is taken from a set of orthogonal DRS.

Furthermore, in the downlink, a broadcast channel is used for transmission of control information to the UEs from a base station. The information in this broadcast channel is composed of multiple segments of information, denoted control channel elements (CCE). Each UE is allocated with one or several consecutive CCEs and receives its dedicated control information, denoted physical downlink control channel (PDCCH) in its allocated CCE segments. The number of allocated CCEs per PDCCH is 1, 2, 4 or 8.

The PDCCH contains information about where and in which format a downlink data burst, denoted physical downlink shared channel (PDSCH), or an uplink data burst, denoted physical uplink shared channel (PUSCH) is transmitted. The UE first finds and reads the PDCCH, then receives the PDSCH and decode its message. At a later point in time, the UE sends an ACK/NACK in response to the received PDSCH message in the uplink to the base station.

To avoid explicit scheduling of a resource index (DRS indices or ACK/NACK indices) to be used for this ACK/NACK message, it is implicitly indicated from the location of the PDCCH which contained information about the decoded PDSCH. More precisely, the location (index) of the first CCE in the PDCCH uniquely determines the resource index to be used for the uplink ACK/NACK transmission.

SUMMARY OF THE INVENTION

The inventor finds that the conventional art can only assign one resource index to a UE. But in some situations, the UE needs more resource indices to transmit uplink data. It is a problem to determine multiple resource indices for a UE implicitly.

The further problem is how to determine at least two resource indices for a UE if the number of available resource indices in each resource block (RB) is the same.

The further problem is how to determine at least two resource indices for a UE if the number of available resource indices in the first RB is less than the number of available resource indices in other RBs.

The further problem is how to determine at least two resource indices for a UE if the number of available resource indices in each RB is different.

The further problem is how to operate if the number of resource indices for a UE exceeds the number of available resource indices in one RB.

The further problem is how to allocate the determined DRS indices to the multiple logical antennas of the UE.

The further problem is how to allocate the at least two determined ACK/NACK indices to one logical antenna of the UE.

With a purpose of solving one or more of the above indicated problems, and from the standpoint of the above indicated field of invention, the present invention teaches that:

One embodiment of the present invention provides a method for determining a resource index in a wireless communication system, including:

for at least two CCEs for a UE, mapping the CCEs to at least two resource indices for the UE according to a predetermined mapping rule.

For further development, the method further includes establishing the at least two CCEs for the UE.

Furthermore, the mapping of the CCEs to at least two resource indices for the UE according to a predetermined mapping rule includes:

determining at least two resource indices for the UE, wherein each resource index is determined according to $$\mathrm{mod}(s+m, K) + a$$

where s is the first CCE index of the UE, m is an offset, where $m \geq 0$, K is the number of available resource indices within one resource block (RB), and a is a value between 0 and N-1, where N is the number of CCEs for the UE.

Furthermore, the mapping of the CCEs to at least two resource indices for the UE according to a predetermined mapping rule includes:

determining at least two resource indices for the UE, wherein each resource index is determined according to $$\begin{cases} s+m+a & \text{if } s+m < K^{re} \\ \mathrm{mod}(s+m-K^{re}, K) + a & \text{if } s+m \geq K^{re} \end{cases}$$

where s is the first CCE index of the UE, m is an offset, where $m \geq 0$, a is a value between 0 and N-1, where N is the number of CCEs for the UE, $K^{re}$ is the number of available resources indices in the first RB, and K is the number of available resources indices within a second RB.

Furthermore, the mapping of the CCEs to at least two resource indices for the UE according to a predetermined mapping rule includes:

determining at least two resource indices for the UE, wherein each resource index is determined according to $$s + m - \sum_{m=0}^{n-1} K^m + a, \text{ where } \sum_{m=0}^{n-1} K^m < s+m \leq \sum_{m=0}^{n} K^m$$

where s is the first CCE index of the UE, m is an offset, where $m \geq 0$, and $K^m$ is the number of available resource indices in the $RB_m$, where m=0, 1, … M-1, where M is the number of available RBs for resource indices, a is a value between 0 and N-1, where N is the number of CCEs for the UE, and n is the RB index for the UE.

For further development, in response to at least one of the determined resource indices for the UE exceeds the number of available resource indices in one RB, the method further includes:

removing the at least one of the determined resource indices; or rearranging the position of the CCEs that will be received by the UE to make sure that the resource indices for the UE are in one RB.

Furthermore, the resource indices are DRS indices or ACK/NACK indices.

For further development, the UE has multiple logical antennas, the method further includes: allocating, by the UE, one determined DRS index for each logical antenna.

Furthermore, the method further includes:

allocating at least two determined ACK/NACK indices for one logical antenna.

Furthermore, wherein the method further includes:

allocating at least one determined ACK/NACK index for one logical antenna.

One embodiment of the present invention provides an apparatus for determining a resource index in a wireless communication system, including:

a mapping unit, configured to map at least two CCEs for a UE to at least two resource indices for the UE according to a predetermined mapping rule.

Furthermore, the apparatus includes:

an establishing unit, configured to establishing the at least two CCEs for the UE.

Furthermore, the mapping unit includes:

a first determining unit, configured to determine at least two resource indices for the UE, wherein each resource index is determined according to $$\mathrm{mod}(s+m, K)+a$$

where s is the first CCE index of the UE, m is an offset, where $m \geq 0$, K is the number of available resource indices within one resource block (RB), and a is a value between 0 and N-1, where N is the number of CCEs for the UE.

Furthermore, the mapping unit includes:

a second determining unit, configured to determine at least two resource indices for the UE, wherein each resource index is determined according to $$\begin{cases} s+m+a & \text{if } s+m < K^{re} \\ \mathrm{mod}(s+m-K^{re}, K)+a & \text{if } s+m \geq K^{re} \end{cases}$$

where s is the first CCE index of the UE, m is an offset, where $m \geq 0$, a is a value between 0 and N-1, where N is the number of CCEs for the UE, $K^{re}$ is the number of available resources indices in the first RB, and K is the number of available resources indices within a second RB.

Furthermore, the mapping unit includes:

a third determining unit, configured to determine at least two resource indices for the UE, wherein each resource index is determined according to $$s+m-\sum_{m=0}^{n-1} K^m + a, \text{ where } \sum_{m=0}^{n-1} K^m < s+m \leq \sum_{m=0}^{n} K^m$$

where s is the first CCE index of the UE, m is an offset, where $m \geq 0$, and $K^m$ is the number of available resource indices in the $RB_m$, where m=0, 1, ... M-1, where M is the number of available RBs for resource indices, a is a value between 0 and N-1, where N is the number of CCEs for the UE, and n is the RB index for the UE.

For further development, in response to at least one of the determined resource indices for the UE exceeds the number of available resource indices in one RB, the apparatus further includes:

a removing unit, configured to remove the at least one of the determined resource indices; and/or a rearranging unit, configured to rearrange the position of the CCEs that will be received by the UE to make sure that the resource indices for the UE are in one RB.

Furthermore, the resource indices are DRS indices or ACK/NACK indices.

Further, if the UE has multiple logical antennas, the apparatus further includes:

a first allocating unit, configured to allocate one determined DRS index for each logical antenna.

Furthermore, the apparatus further includes:

a second allocating unit, configured to allocate at least two determined ACK/NACK indices for one logical antenna.

Furthermore, the apparatus further includes:

a third allocating unit, configured to allocate at least one determined ACK/NACK index for one logical antenna.

One embodiment of the present invention provides a system for determining a resource index in a wireless communication system, including:

a base station, configured to communicate to a UE; wherein the base station is configured to allocate at least two CCEs to the UE; map the CCEs to at least two resource indices for the UE according to a predetermined mapping rule, and send the CCEs to the UE; and the UE is configured to receive the CCEs from the base station, and map the CCEs to at least two resource indices for the UE according to a predetermined mapping rule.

One embodiment of the present invention provides a computer program product comprising computer program code, which when executed, enables a computer to perform the steps of above methods.

Furthermore, the computer program code, when executed, enables a computer to perform the steps of a user equipment in above methods.

Furthermore, the computer program code, when executed, enables a computer to perform the steps of a base station in above methods.

One embodiment of the present invention provides a computer readable medium, wherein the above computer program code is carried by the computer readable medium.

The advantages of a method, apparatus and system according to some embodiments of the present invention are that it can determine multiple resource indices to a UE implicitly via mapping the CCEs to at least two resource indices for the UE according to predetermined mapping rule.

The further advantage according to one embodiment is that it can determine at least two resource indices for a UE if the number of available resource indices in each RB is the same.

The further advantage according to one embodiment is that it can determine at least two resource indices for a UE if the number of available resource indices in the first RB is less than the number of available resource indices in other RBs.

The further advantage according to one embodiment is that it can determine at least two resource indices for a UE if the number of available resource indices in each RB is different.

The further advantage according to one embodiment is that it can avoid some unavailable resource indices for a UE which exceeds the number of available resource indices in one RB.

The further advantage according to one embodiment is that after allocating one DRS index to each logical antenna, the UE with multiple logical antennas can transmit uplink data via different logical antenna. This will improve the uplink performance of a UE through transmit diversity especially when it is a cell edge UE.

The further advantage according to one embodiment is that after allocating at least two ACK/NACK indices for one logical antenna, the UE can transmit uplink data through code or spatial multiplexing via the logical antenna. This will increase the uplink information transmission capacity through code or spatial multiplexing.

BRIEF DESCRIPTION OF THE DRAWINGS

Some methods, a apparatus, and system according to the present invention will now be described in detail with reference to the accompanying drawings, in which.

DETAILED DESCRIPTION OF THE INVENTION

In order to give an understanding of the present invention it is firstly described how a UE can transmit uplink information using the following data structure.

When a UE transmits uplink control information to a base station, the uplink control information will be confined to one RB which may contain 12 sub-carriers and 6 or 7 symbols depending on a cyclic prefix (CP) size. Without loss of generality, we will assume that there are 7 symbols per RB in the following description. The uplink control information may be physical uplink control channel (PUCCH). For example, the acknowledgment (ACK/NACK) in response to downlink packet transmission is transmitted on the PUCCH.

Figure 1:
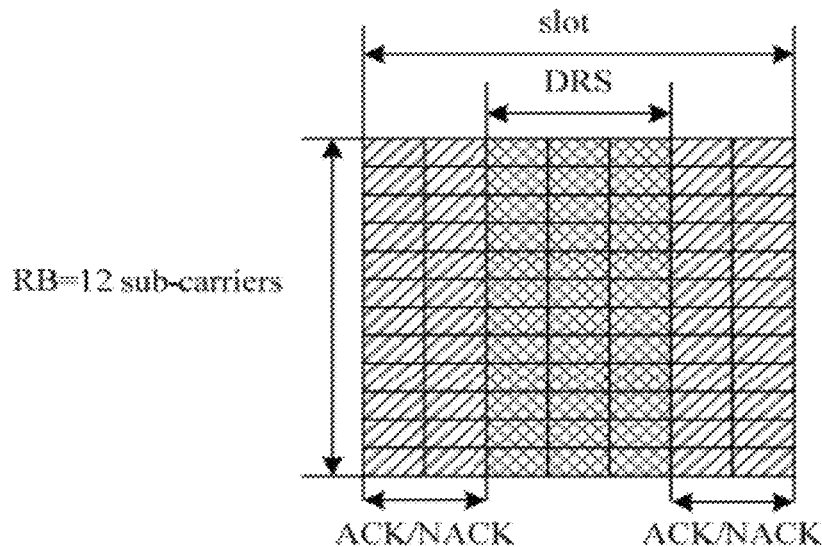
FIG. 1 is a schematic and simplified illustration of a multiplexing structure of DRS and ACK/NACK in one RB.

In the RB for uplink information transmission, three symbols are used for DRS transmission, and the remaining four symbols are used for uplink information transmission. The uplink information may be ACK/NACK or scheduling request. Without loss of generality, this embodiment takes ACK/NACK for an example to describe the RB structure. The multiplexing structure of DRS and ACK/NACK in one RB is illustrated in FIG. 1.

In each time slot of transmitting ACK/NACK on PUCCH, a UE will use one DRS from a set of available DRSs to enable the use of coherent detection of the information in the base station.

A sequence with length 12 is used to transmit ACK/NACK or DRS in each symbol. Given a base sequence of length 12, a set of 12 sequences are generated. These are obtained by multiplication with a linear phase with slope $2\pi\alpha/12$ as follows $$r^\alpha(n) = e^{j2\pi n\alpha/12} r(n), \; n=0,1,\ldots,11; \alpha=0,1,\ldots,11 \quad (1)$$

where r(n) is the base sequence with length 12, and $r^\alpha(n)$ is the modified base sequence. The linear phase shift operations in formula (1) are performed in frequency domain and a linear phase shift in frequency domain corresponds to a cyclic shift in time domain. Therefore, the 12 frequency domain sequences in formula (1) correspond to 12 different cyclic shifts of the base sequence in the time domain. These 12 sequences are orthogonal in the time domain due to this particular choice of the linear phase shift slopes $2\pi\alpha/12$.

If each UE uses a cyclic shift (or equivalently a phase slope $2\pi\alpha/12$) for its DRS, and different UEs are assigned DRS through the cyclic shifts, in this way it means that if there is a single symbol used for DRS, there are at most 12 UEs multiplexing together per RB. However, there are three symbols available for DRS in the ACK/NACK structure. In order to further improve UE multiplexing capacity, code covering in the time domain is used. Three orthogonal sequences (OS) of length 3 are used for DRS. The three orthogonal sequences (OS) for DRS are shown in Table 1.

TABLE 1

| OS Sequence index | OS [w(0) w(1) w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

According to the above structure, it can be observed that at most K=12*3=36 DRS that are orthogonal in time-frequency domain could be supported. If one DRS is allocated for each UE, up to 36 UEs will be supported in one RB.

The 36 DRS are numbered as k=0, 1, . . . 35. The index of DRS is related to the cyclic shift and OS. For example, the relation between the DRS index and the cyclic shift and OS is illustrated in Table 2.

TABLE 2

| Cyclic shift index | $OS_{index} = 0$ | $OS_{index} = 1$ | $OS_{index} = 2$ |
|---|---|---|---|
| 0 | k = 0 | 12 | 24 |
| 1 | 1 | 13 | 25 |
| 2 | 2 | 14 | 26 |
| 3 | 3 | 15 | 27 |
| 4 | 4 | 16 | 28 |
| 5 | 5 | 17 | 29 |

TABLE 2-continued

| Cyclic shift index | $OS_{index} = 0$ | $OS_{index} = 1$ | $OS_{index} = 2$ |
|---|---|---|---|
| 6 | 6 | 18 | 30 |
| 7 | 7 | 19 | 31 |
| 8 | 8 | 20 | 32 |
| 9 | 9 | 21 | 33 |
| 10 | 10 | 22 | 34 |
| 11 | 11 | 23 | 35 |

Furthermore, $\Delta_{shift}$ is defined as the cyclic shift difference between two adjacent i DRS using the same OS, and it can be decided to be different from one, considering multipath delay spreads for the given cell deployment. In the embodiment, three candidate values {1, 2, 3} for $\Delta_{shift}$ are used which is configured by base station through higher layer signalling. For example, if $\Delta_{shift}=2$, then there are only 18 DRS available.

If the CCE index is larger than the number K of available DRS in one RB, a second RB is allocated for PUCCH transmission and the DRS allocation continues but the PUCCH transmission is now using this second RB. The above is only the illustration of DRS resources in one RB, and it is possible to there are several RBs allocated for PUCCH. These RBs for PUCCH would have the same kind of DRS resources. So in this case, if a UE wants to transmit uplink information to a base station, it has to know the corresponding RB index, i.e., which RB to transmit the uplink information of the UE, the DRS index, and ACK/NACK indices implicitly allocated by the base station. After getting the DRS index, the corresponding cyclic shift and OS would be obtained according to Table 2.

Even though a UE has to get the RB index, DRS index and ACK/NACK indices when it transmit uplink information, the determining process of the index, DRS index and ACK/NACK indices is separate and independent to each other.

Figure 2:
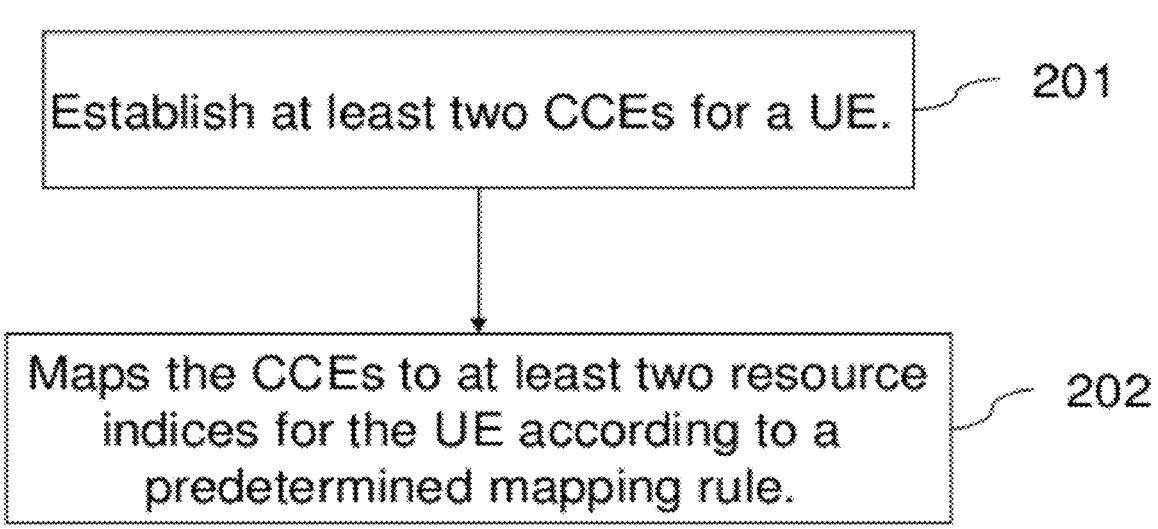
FIG. 2 is a block diagram of one embodiment of the present invention.

One embodiment of the present invention will now be described with reference to FIG. 2 showing a method for determining a resource index in a wireless communication system. This method may be performed by a UE or a base station.

Block 201, a UE or a base station may establish at least two CCEs for a UE.

When this method is performed by a UE, the block 101 is:

the UE receives at least two CCEs of the UE from a downlink control channel.

When this method is performed by a base station, the block 101 is:

the base station allocates at least two CCEs to the UE.

Block 202, maps the CCEs to at least two resource indices for the UE according to a predetermined mapping rule.

Concretely, block 202 may include the following situations.

A. If the number of available resource indices in each RB is the same, determines at least two resource indices for the UE, and each resource index is determined according to the following formula (2).

$$\text{mod}(s+m, K)+a \qquad (2)$$

Furthermore, the UE or the base station can also determine the RB index for the UE according to the following formula (3).

$$RB = \left\lceil \frac{s+m}{K} \right\rceil \qquad (3)$$

where s is the first CCE index of the UE, m is an offset, where $m \geq 0$, K is the number of available resource indices within one RB, and a is a value between 0 and N-1 and may corresponding to the ath CCE of this UE, where N is the number of CCEs for the UE. How to decide a is predefined rule between the base station and the UE.

The value of K varies with the step size $\Delta_{shift}$ and CP size according to $$K = \frac{12*c}{\Delta_{shift}} \qquad (4)$$

$$c = \begin{cases} 3 & \text{normal } CP \\ 2 & \text{extended } CP \end{cases}$$

Where $\Delta_{shift} \in \{1,2,3\}$, and c is the number of OS. Generally speaking, if one RB has 7 symbols, the c=3, and if the RB only has 6 symbols, the c=2.

B. If the number of available resource indices in the first RB is less than the number of available resource indices in a second RB, determines at least two resource indices for the UE, and each resource index is determined according to the following formula (5).

$$\begin{cases} s+m+a & \text{if } s+m < K^{re} \\ \text{mod}(s+m-K^{re}, K)+a & \text{if } s+m \geq K^{re} \end{cases} \qquad (5)$$

Furthermore, the UE or the base station can also determine the RB index for the UE according to the following formula (6).

$$RB = \begin{cases} 1 & \text{if } s+m < K^{re} \\ \left\lceil \frac{s+m-K^{re}}{K} \right\rceil + 1 & \text{if } s+m \geq K^{re} \end{cases} \qquad (6)$$

where s is the first CCE index of the UE, m is an offset, where $m \geq 0$, a is a value between 0 and N-1 and may corresponding to the ath CCE of this UE, where N is the number of CCEs for the UE, $K^{re}$ is the number of available resources indices in the first RB, and K is the number of available resources indices within a second RB. Here the second RB has a general meaning of the other RB except the first RB in the uplink channel.

Sometimes, one of the several RBs allocated for uplink information transmission has only $K^{re}$ resource indices reserved for its use, where the number of available resource indices $K^{re}$ is less than K.

C. If the number of available resource indices in each RB is different, where the number of available resource indices within $RB_m$ is $K^m$, where m=0, 1 ... M-1, determines the RB index for the UE according to the following formula (7).

$$RB = n, \text{ where } \sum_{m=0}^{n-1} K^m < s+m \leq \sum_{m=0}^{n} K^m \qquad (7)$$

Determines at least two resource indices for the UE, and each resource indices is determined according to the following formula (8), $$s+m-\sum_{m=0}^{n-1} K^m + a, \text{ where } \sum_{m=0}^{n-1} K^m < s+m \leq \sum_{m=0}^{n} K^m \qquad (8)$$

where s is the first CCE index of the UE, m is an offset, where $m \geq 0$, and $K^m$ is the number of available resource indices in the $RB_m$, where m=0, 1, . . . M-1, where M is the number of available RBs for resource indices transmission, a is a value between 0 and N-1 and may correspond to the ath CCE of this UE, where N is the number of CCEs for the UE, and n is the RB index for the UE.

For the above situations, if N CCEs are established for the UE, there will also be maximum N resource indices available for the UE. When determining the at least two resource indices for the UE from the CCE indices, it is very flexible to get the DRS indices. The base station or the UE can only maps a part of the CCE indices of the UE to the resource indices or maps the all CCE indices of the UE to the resource indices; when mapping a part of the CCE indices of the UE to the resource indices, the base station or the UE may map a discretionary CCE index of the UE to a resource index. For example, 4 CCEs with indices 4, 5, 6, 7 are established for a UE, but it only maps the CCE indices 4, 7 to resource indices for the UE. Anyway, the mapping rule from the CCE indices to resource indices are predefined, i.e., both base station and UE can identify this rule. A set of the resource indices of a UE may be noted as Z.

Usually the elements of Z are less than the number of available resource indices in one RB, i.e. the allocated resource for one UE is in the same RB.

However, there exists a special case, where one or more element(s) in the resource indices for a UE, for example, the largest element, exceeds the number of available resource indices within one RB and therefore the determined resource indices for the UE will be mapped to different RBs. If the resource indices in one RB are numbered from 0, the exceeds means that one or more element(s) in the resource indices for a UE is larger than or equal to the number of available resource indices in one RB; if the resource indices in one RB are numbered from 1, the exceeds means that one or more element(s) in the resource indices for a UE is larger than the number of available resource indices in one RB. Since the uplink information must be confined to a single RB for satisfying the transmission restriction, and the allocated resource indices are valid for one RB only, this event is not allowed. However, the special case can be avoided by either of the following two solutions.

Exception Solution 1: if at least one of the determined resource indices for the UE exceeds the number of available resource indices in one RB, removes the at least one of the determined resource indices. In this case, fewer than N DRSs are obtained for the UE.

Exception Solution 2: proper assignment of the CCEs of the downlink information in the downlink to avoid the problem.

If at least one of the determined resource indices for the UE exceeds the number of available resource indices in one RB, the base station rearranges the position of the CCEs that will be received by the UE to make sure that the resource indices for the UE are in one RB. Then the RB index for the UE will be changed to the one that the current resource indices for the UE belonged to.

It is noted that the index of the first CCE of each UE should be an integer times of the number of CCEs (1, 2, 4 or 8) in the PDCCH transmitted to the UE.

Figure 3:
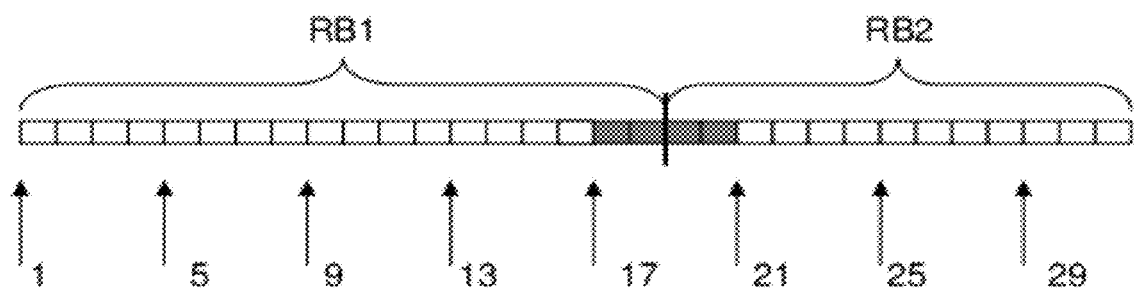
FIG. 3 is a schematic diagram of CCEs structure of an example.

As show in FIG. 3, an example with 31 CCEs where the arrows indicate allowed starting positions for PDCCH consisting of four CCEs. Each RB can hold at maximum 18 CCE in this example.

Figure 4:
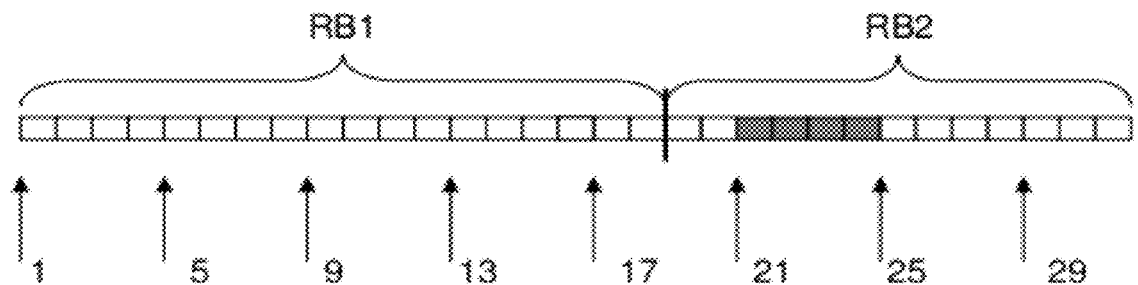
FIG. 4 is a schematic diagram of another CCEs structure of an example.

For example, assume that the downlink control channels consists of a number of PDCCHs is divided into a total of 31 CCE's and that each RB can have maximum 18 resource index. Then CCE index 1-18 is mapped to RB1 and index 19-31 is mapped to RB2. See FIG. 3. For PDCCHs consisting of 4 CCEs, the allowed starting positions are those CCEs with indices 1, 5, 9, 13, 17, 21, 25 and 29 and they are indicated in FIG. 3 with arrows. Assume that a UE is allocated the PDCCH with starting CCE index 17. The corresponding four resource indices will then belong to both RB1 and RB2, as shown as CCEs marked with grey shade in FIG. 3. Since the resource index shall point out a single RB, the set of resource indices in FIG. 3 is not allowed. Instead, the base station may arrange the allocation of the PDCCH consisting of 4 CCEs to this UE as shown in FIG. 4.

The resource indices may be DRS indices or ACK/NACK indices. As described above, the mapping process of RB index, DRS indices and ACK/NACK indices is separate and independent to each other.

Sometimes, indices hopping are used in the cell to randomize the inter-cell or intra-cell interference. The indices hopping mean that the indices will change with the time according to a certain hopping pattern. Therefore, after determining the above resource indices (RB index or ACK/NACK indices or DRS indices), it may further obtain the finial resource indices according to the predefined hopping pattern.

The UE may use the resource indices to transmit the uplink information. It may include the following situations.

A. The UE with multiple logical antennas, allocates one determined DRS index for each logical antenna.

A logical antenna is defined as a linear combination of the physical antenna(s) to transmit data. If some physical antennas do not have DRS index, they can not be called as logical antenna. Whatever is transmitted from the logical antenna will undergo the defined mapping and be transmitted from the physical antenna(s). In this way, the receiver will see the physical antenna(s) as an equivalent single transmit antenna, or logical antenna. Actually, with this arrangement, the receiver becomes agnostic to the number of physical antennas. The concept of logical antenna can be extended to multiple logical antennas and each logical antenna is then associated with a unique DRS.

In this case, because at least two different logical antennas have a different determined DRS index, the UE can transmit uplink information via different logical antenna. This will improve the uplink performance of a UE through transmit diversity especially when it is a cell edge UE.

Furthermore, the UE may allocate at least one determined ACK/NACK index for one logical antenna.

B. The UE with one or more logical antennas allocates at least two determined ACK/NACK indices for one logical antenna.

In this case, because one logical antenna has at least two determined ACK/NACK indices, the UE can transmit uplink data through code or spatial multiplexing via the logical antenna. This may increase the uplink information transmission capacity through code or spatial multiplexing, Furthermore, The UE may allocate at least one determined DRS index for one logical antenna.

In the prior art, only one resource index can be assigned for a UE. According to the embodiment of the present invention we can see that it can determine multiple resource indices for a UE implicitly because it maps the CCEs to at least two resource indices for the UE according to predetermined mapping rule. It can determine at least two resource indices for a UE if the number of available resource indices in each RB is the same, or if the number of available resource indices in the first RB is less than the number of available resource indices in other RBs, or if the number of available resource indices in each RB is different. It can avoid some unavailable resource indices for a UE which exceeds the number of available resource indices in one RB. After allocating one DRS index to each logical antenna, the UE with multiple logical antennas can transmit uplink data via different logical antenna. This will improve the uplink performance of a UE through transmit diversity especially when it is a cell edge UE. Furthermore, after allocating at least two ACK/NACK indices for one logical antenna, the UE can transmit uplink data through code or spatial multiplexing via the logical antenna. This will increase the uplink information transmission capacity through code or spatial multiplexing.

Figure 5:
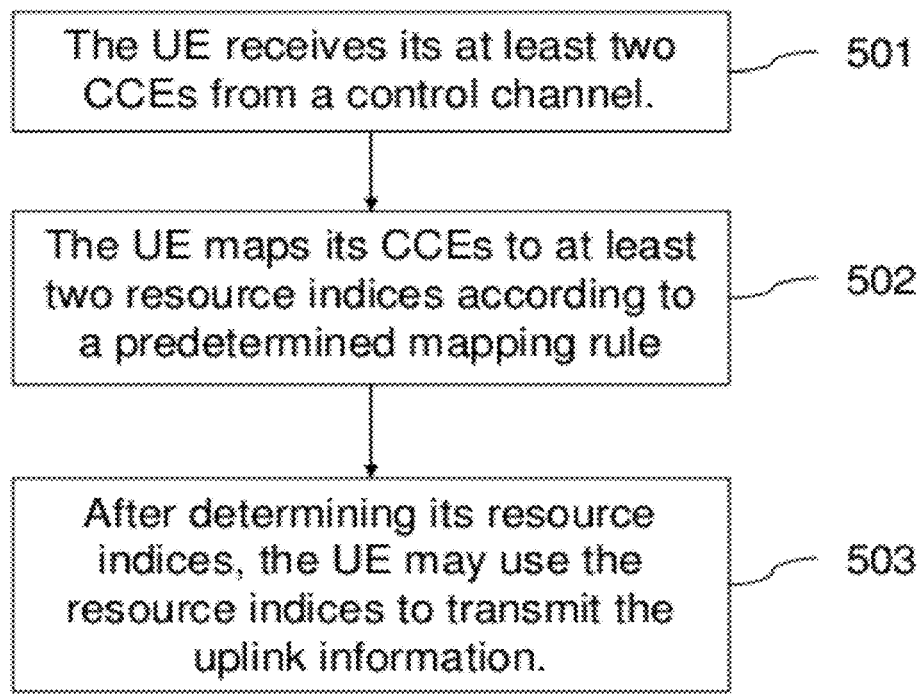
FIG. 5 is a block diagram of one embodiment of the present invention.

One embodiment of the present invention will now be described with reference to FIG. 5 showing a method for a UE to determine a resource index in a wireless communication system.

Block 501, the UE receives its at least two CCEs from a control channel.

Figure 6:
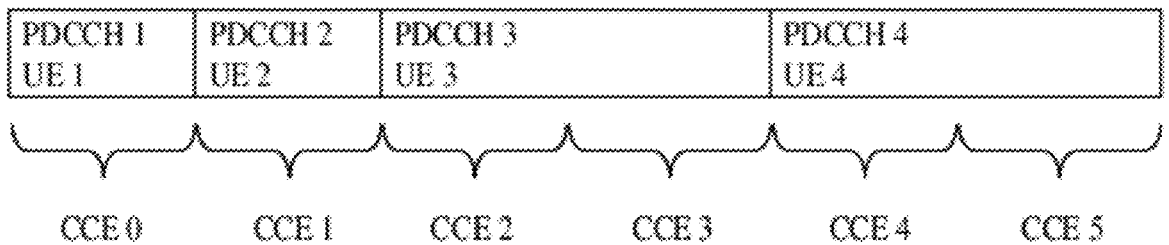
FIG. 6 is a schematic diagram of CCEs structure of an example.

The UE may receive a plurality of CCEs as showed in FIG. 6, and the UE will pick up its CCEs according to its identification.

Block 502, the UE maps its CCEs to at least two resource indices according to a predetermined mapping rule.

Before mapping, the UE may find the CCE indices according to the positions of its CCEs in a CCE sequence received from the control channel.

Referring to the example in FIG. 3, UE 1 will find its CCE index 0. UE 4 will find its CCE indices {4, 5}.

In this case, the UE maps its CCE indices to at least two resource indices according to a predetermined mapping rule. Concretely, it may include the following situations.

A. If the number of available resource indices in each RB is the same, determines at least two resource indices for the UE, and each resource index is determined according to the formula (2).

Furthermore, the UE or the base station can also determine the RB index for the UE according to the formula (3).

B. If the number of available resource indices in the first RB is less than the number of available resource indices in a second RB, determines at least two resource indices for the UE, and each resource index is determined according to the formula (5).

Furthermore, the UE or the base station can also determine the RB index for the UE according to the formula (6).

Sometimes, one of the several RBs allocated for uplink information transmission has only $K^{re}$ resource indices reserved for its use, where the number of available resource indices $K^{re}$ is less than K.

C. If the number of available resource indices in each RB is different, where the number of available resource indices within $RB_m$ is $K^m$, where m=0, 1 . . . M-1, determines the RB index for the UE according to the formula (7).

Determines at least two resource indices for the UE, and each resource indices is determined according to the following formula (8).

For the above situations, if the UE receives N CCE indices allocated by the base station, there will also be maximum N resource indices available for the UE. When the UE maps the at least two resource indices from its CCE indices, it is very flexible to get the resource indices. The UE can only maps a part of its CCE indices to the resource indices or maps the all its CCE indices to the resource indices; when mapping a part of its CCE indices to the resource indices, the UE may map a discretionary CCE index of the UE to a resource index. For example, the UE receives 4 CCE indices 4, 5, 6, 7, but it only maps the CCE indices 4, 7 to its resource indices. Anyway, the mapping rule from the CCE indices to resource indices are predefined, i.e., both base station and UE can identify this rule.

If at least one of the determined resource indices for the UE exceeds the number of available resource indices in one RB, the UE removes the at least one of the determined resource indices. In this case, fewer than N DRSs are obtained for the UE.

The resource indices may be DRS indices or ACK/NACK indices. The mapping process of RB index, DRS indices and ACK/NACK indices is separate and independent to each other.

Sometimes, indices hopping are used in the cell to randomize the inter-cell or intra-cell interference. The indices hopping mean that the indices will change with the time according to a certain hopping pattern. Therefore, after determining the above resource indices (RB index or ACK/NACK indices or DRS indices), it may further obtain the finial resource indices according to the predefined hopping pattern.

Block 503, after determining its resource indices, the UE may use the resource indices to transmit the uplink information. It may include the following situations.

A. The UE has multiple logical antennas allocates one determined DRS index for each logical antenna.

In this case, because at least two different logical antennas have a different determined DRS index, the UE can transmit uplink information via different logical antenna. This will improve the uplink performance of a UE through transmit diversity especially when it is a cell edge UE.

Furthermore, the UE may allocate at least one determined ACK/NACK index for one logical antenna.

B. The UE with one or more logical antennas allocates at least two determined ACK/NACK indices for one logical antenna.

In this case, because one logical antenna has at least two determined ACK/NACK indices, the UE can transmit uplink data through code or spatial multiplexing via the logical antenna. This may increase the uplink information transmission capacity through code or spatial multiplexing, Furthermore, The UE may allocate at least one determined DRS index for one logical antenna.

In the prior art, only one resource index can be assigned for a UE. According to the embodiment of the present invention we can see that the UE can determine multiple resource indices for a UE implicitly because it maps the CCEs to at least two resource indices for the UE according to predetermined mapping rule. In this way, the UE uniquely knows which uplink RB, DRSs and ACK/NACK indices to use when transmitting the PUCCH. The UE can determine at least two resource indices for a UE if the number of available resource indices in each RB is the same, or if the number of available resource indices in the first RB is less than the number of available resource indices in other RBs, or if the number of available resource indices in each RB is different. The UE can avoid some unavailable resource indices for a UE which exceeds the number of available resource indices in one RB. After allocating one DRS index to each logical antenna, the UE with multiple logical antennas can transmit uplink data via different logical antenna. This will improve the uplink performance of a UE through transmit diversity especially when it is a cell edge UE. Furthermore, after allocating at least two ACK/NACK indices for one logical antenna, the UE can transmit uplink data through code or spatial multiplexing via the logical antenna. This will increase the uplink information transmission capacity through code or spatial multiplexing.

Figure 7:
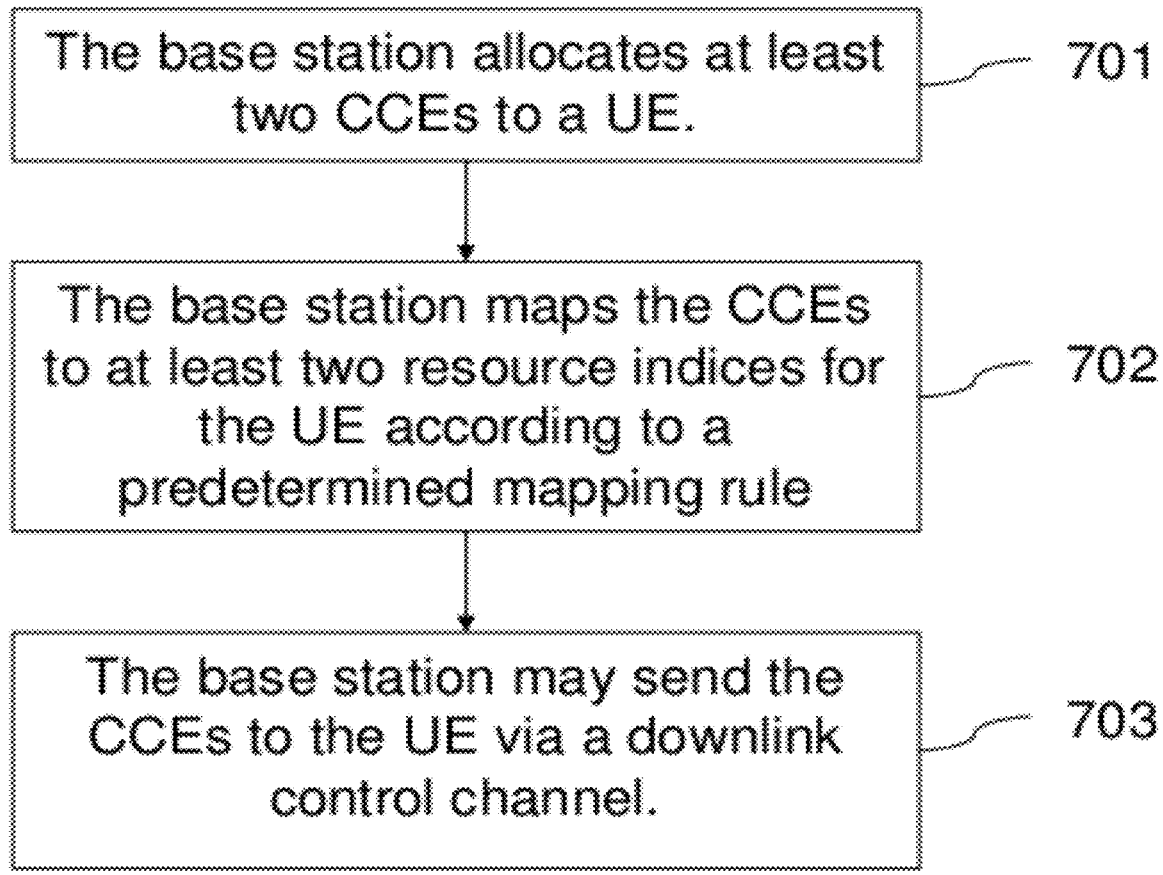
FIG. 7 is a block diagram of one embodiment of the present invention.

One embodiment of the present invention will now be described with reference to FIG. 7 showing a method for a base station to determine a resource index in a wireless communication system.

Block 701, the base station allocates at least two CCEs to a UE.

The base station may schedule a UE by allocating a particular number of CCEs in relation to Channel Quality Information and amount of control information to be transmitted in downlink direction for the UE. For instance, a UE experiencing a low signal to noise ratio (SNR) will be allocated a larger number of CCEs than a high SNR UE since it then can utilize a channel code with a lower code rate to protect the information bits.

Block 702, the base station maps the CCEs to at least two resource indices for the UE according to a predetermined mapping rule.

Concretely, it may include the following situations.

A. If the number of available resource indices in each RB is the same, determines at least two resource indices for the UE, and each resource index is determined according to the formula (2).

Furthermore, the UE or the base station can also determine the RB index for the UE according to the formula (3).

B. If the number of available resource indices in the first RB is less than the number of available resource indices in a second RB, determines at least two resource indices for the UE, and each resource index is determined according to the formula (5).

Furthermore, the UE or the base station can also determine the RB index for the UE according to the formula (6).

Sometimes, one of the several RBs allocated for uplink information transmission has only $K^{re}$ resource indices reserved for its use, where the number of available resource indices $K^{re}$ is less than K.

C. If the number of available resource indices in each RB is different, where the number of available resource indices within $RB_m$ is $K^m$, where m=0, 1 ... M-1, determines the RB index for the UE according to the formula (7).

Determines at least two resource indices for the UE, and each resource indices is determined according to the following formula (8), For the above situations, if the base station allocates N CCE indices for the UE, there will also be maximum N resource indices available for the UE. When the base station maps the at least two resource indices for the UE from the CCE indices, it is very flexible to get the resource indices. The base station can only maps a part of the CCE indices of the UE to the resource indices or maps the all CCE indices of the UE to the resource indices; when mapping a part of the CCE indices of the UE to the resource indices, the base station may map a discretionary CCE index of the UE to a resource index. For example, the base station allocates 4 CCE indices 4, 5, 6, 7 for a UE, but it only maps the CCE indices 4, 7 to resource indices for the UE. If at least one of the determined resource indices for the UE exceeds the number of available resource indices in one RB, the base station may remove the at least one of the determined resource indices. In this case, fewer than N DRSs are obtained for the UE. In other way, the base station may rearrange the position of the CCEs that will be received by the UE to make sure that the resource indices for the UE are in one RB. Then the base station may change the RB index for the UE to the one that the current resource indices for the UE belonged to.

The resource indices may be DRS indices or ACK/NACK indices. As described above, the mapping process of RB index, DRS indices and ACK/NACK indices is separate and independent to each other.

After the base station maps the CCE indices to at least two resource indices for the UE, it may record the RB index and DRS indices and ACK/NACK indices for the UE.

Block 703, the base station may send the CCEs to the UE via a downlink control channel.

In the base station to UE transmission, i.e. downlink, a number of control channels, denoted PDCCH, each intended for a particular UE, is transmitted. Each PDCCH consists of 1, 2, 4 or 8 CCE. An example of the mapping of PDCCH to CCEs is given in FIG. 6 where four UEs are assumed and UE 1 and UE 2 use a single CCE each and UE 3 and UE 4 use two CCE each.

According to the embodiment of the present invention we can see that the base station can determine multiple resource indices for a UE implicitly because it maps the CCEs to at least two resource indices for the UE according to predetermined mapping rule. So the base station uniquely knows which RB, DRSs and ACK/NACK indices are allocated to each UE and which RB, DRSs and ACK/NACK indices to assume when demodulating the PUCCH from each UE. The base station can determine at least two resource indices for a UE if the number of available resource indices in each RB is the same, or if the number of available resource indices in the first RB is less than the number of available resource indices in other RB, or if the number of available resource indices in each RB is different. The base station can avoid some unavailable resource indices for a UE which exceeds the number of available resource indices in one RB.

Figure 8:
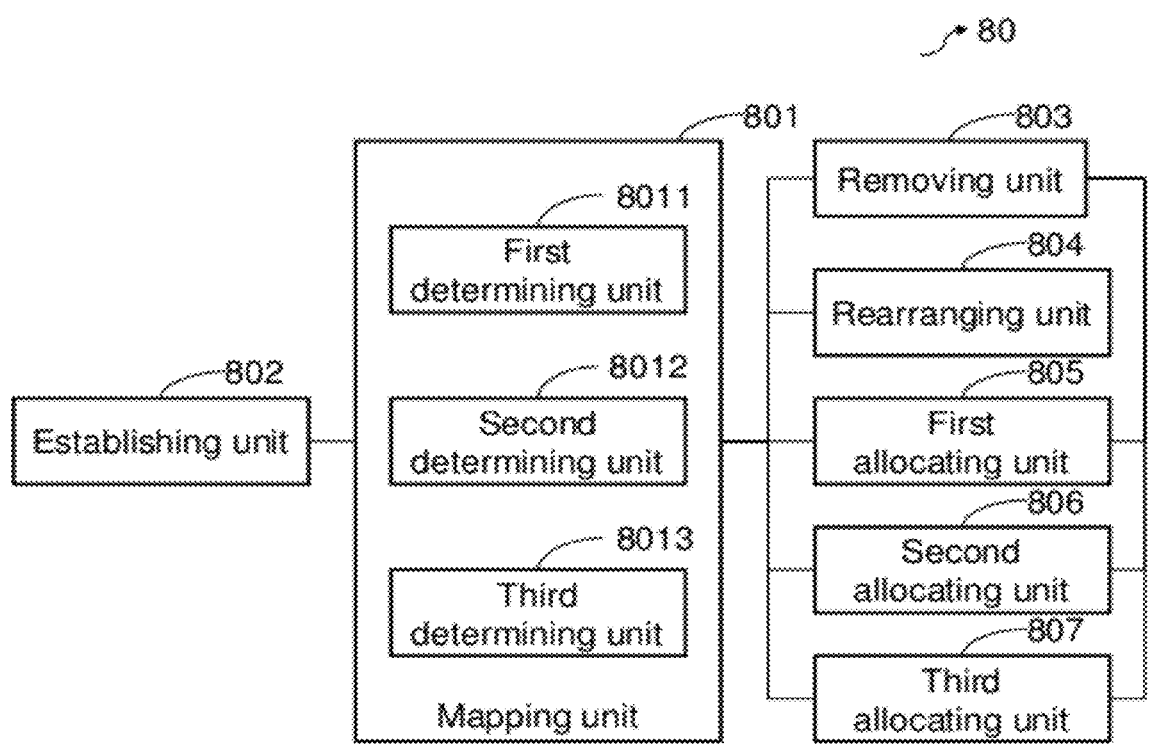
FIG. 8 is an architecture diagram of an apparatus of one embodiment of the present invention.

One embodiment of the present invention will now be described with reference to FIG. 8 showing an apparatus 80 for determining a resource index in a wireless communication system, which includes a mapping unit 801.

The mapping unit 801 is configured to map at least two CCEs for a UE to at least two resource indices for the UE according to a predetermined mapping rule.

The apparatus 80 may further include an establishing unit 802 configured to establishing the at least two CCEs for the UE.

The mapping unit 801 may further include at least one following unit: a first determining unit 8011, a second determining unit 8012, and a third determining unit 8013.

The first determining unit 8011 is configured to determine at least two resource indices for the UE, and each resource index is determined according to $$\text{mod}(s+m, K)+a$$

where s is the first CCE index of the UE, m is an offset, where m≧0, K is the number of available resource indices within one RB, and a is a value between 0 and N-1, where N is the number of CCEs for the UE.

The second determining unit 8012 is configured to determine at least two resource indices for the UE, and each resource index is determined according to $$\begin{cases} s+m+a & \text{if } s+m < K^{re} \\ \text{mod}(s+m-K^{re}, K)+a & \text{if } s+m \geq K^{re} \end{cases}$$

where s is the first CCE index of the UE, m is an offset, where m≧0, a is a value between 0 and N-1, where N is the number of CCEs for the UE, $K^{re}$ is the number of available resources indices in the first RB, and K is the number of available resources indices within a second RB.

The third determining unit 8013, configured to determine at least two resource indices for the UE, and each resource index is determined according to $$s+m-\sum_{m=0}^{n-1}K^m+a, \text{ where } \sum_{m=0}^{n-1}K^m<s+m\leq\sum_{m=0}^{n}K^m$$

where s is the first CCE index of the UE, m is an offset, where m≧0, and $K^m$ is the number of available resource indices in the $RB_m$, where m=0, 1, . . . M-1, where M is the number of available RBs for resource indices, a is a value between 0 and N-1, where N is the number of CCEs for the UE, and n is the RB index for the UE.

If at least one of the determined resource indices for the UE exceeds the number of available resource indices in one RB, The apparatus 80 may further include a removing unit 803 and/or a rearranging unit 804.

The removing unit 803 is configured to remove the at least one of the determined resource indices.

The rearranging unit 804 is configured to rearrange the position of the CCEs that will be received by the UE to make sure that the resource indices for the UE are in one RB.

The resource indices are DRS indices or ACK/NACK indices.

The apparatus 80 may further include a first allocating unit 805 and/or a second allocating unit 806.

The first allocating unit 805 is configured to allocate one determined DRS index for each logical antenna if the UE has multiple logical antennas.

The second allocating unit 806 is configured to allocate at least two determined ACK/NACK indices for one logical antenna.

The apparatus 80 may further include a third allocating unit 807 configured to allocate at least one determined ACK/NACK index for one logical antenna.

The apparatus 80 may be a UE or a base station.

According to the embodiment of the present invention we can see that the apparatus 80 can determine multiple resource indices for a UE implicitly because the apparatus 80 maps the CCEs to at least two resource indices for the UE according to predetermined mapping rule. The apparatus 80 can determine at least two resource indices for a UE if the number of available resource indices in each RB is the same, or if the number of available resource indices in the first RB is less than the number of available resource indices in other RBs, or if the number of available resource indices in each RB is different. The apparatus 80 can avoid some unavailable resource indices for a UE which exceeds the number of available resource indices in one RB. If the apparatus 80 is a UE, after allocating one DRS index to each logical antenna, the UE with multiple logical antennas can transmit uplink data via different logical antenna. This will improve the uplink performance of a UE through transmit diversity especially when it is a cell edge UE. Furthermore, if the apparatus 80 is a UE, after allocating at least two ACK/NACK indices for one logical antenna, the UE can transmit uplink data through code or spatial multiplexing via the logical antenna. This will increase the uplink information transmission capacity through code or spatial multiplexing.

Figure 9:
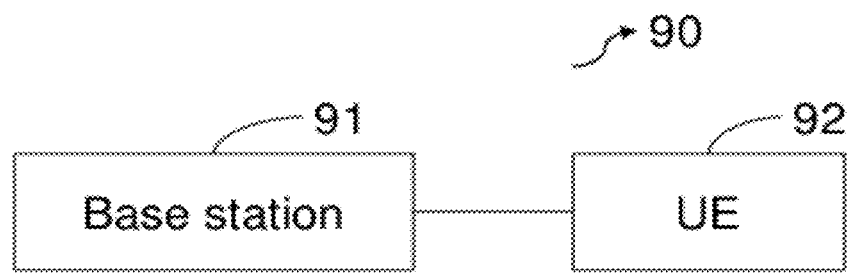
FIG. 9 is an architecture diagram of a system of one embodiment of the present invention.

One embodiment of the present invention will now be described with reference to FIG. 9 showing a system 90 for determining a resource index in a wireless communication system, which includes a base station 91 and a UE 92.

The base station 91 is configured to allocate at least two CCEs to the UE 92; map the CCEs to at least two resource indices for the UE 92 according to a predetermined mapping rule, and send the CCEs to the UE 92.

The UE 92 is configured to receive the CCEs from the base station 91, and map the CCEs to at least two resource indices for the UE 92 according to a predetermined mapping rule.

Figure 10:
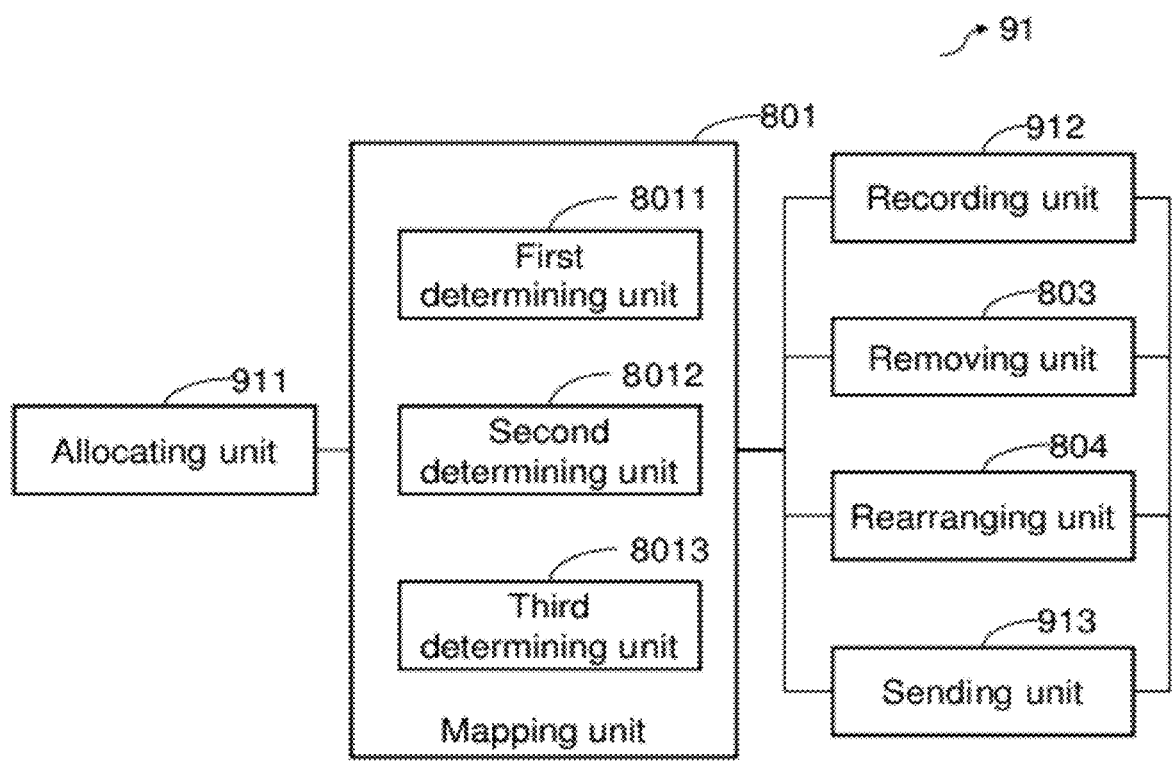
FIG. 10 is an architecture diagram of a UE of one embodiment of the present invention.

Concretely, as shown in FIG. 10, the base station 91 may include a mapping unit 801. The mapping unit 801 is configured to map at least two CCEs for the UE 92 to at least two resource indices for the UE 92 according to a predetermined mapping rule.

The base station 91 may further include an allocating unit 911 configured to allocates the at least two CCEs to the UE 92.

The mapping unit 801 may further include at least one following unit: a first determining unit 8011, a second determining unit 8012, and a third determining unit 8013.

The first determining unit 8011 is configured to determine at least two resource indices for the UE 92, and each resource index is determined according to mod(s+m,K)+a where s is the first CCE index of the UE 92, m is an offset, where m≧0, K is the number of available resource indices within one RB, and a is a value between 0 and N-1, where N is the number of CCEs for the UE 92.

The second determining unit 8012 is configured to determine at least two resource indices for the UE 92, and each resource index is determined according to $$\begin{cases} s+m+a & \text{if } s+m<K^{re} \\ \mod(s+m-K^{re},K)+a & \text{if } s+m\geq K^{re} \end{cases}$$

where s is the first CCE index of the UE 92, m is an offset, where m≧0, a is a value between 0 and N-1, where N is the number of CCEs for the UE 92, $K^{re}$ is the number of available resources indices in the first RB, and K is the number of available resources indices within a second RB.

The third determining unit 8013, configured to determine at least two resource indices for the UE 92, and each resource index is determined according to $$s+m-\sum_{m=0}^{n-1}K^m+a, \text{ where } \sum_{m=0}^{n-1}K^m<s+m\leq\sum_{m=0}^{n}K^m$$

where s is the first CCE index of the UE 92, m is an offset, where m≧0, and $K^m$ is the number of available resource indices in the $RB_m$, where m=0, 1, . . . M-1, where M is the number of available RBs for resource indices, a is a value between 0 and N-1, where N is the number of CCEs for the UE 92, and n is the RB index for the UE 92.

If at least one of the determined resource indices for the UE 92 exceeds the number of available resource indices in one RB, The base station 91 may further include a removing unit 803 and/or a rearranging unit 804.

The removing unit 803 is configured to remove the at least one of the determined resource indices.

The rearranging unit 804 is configured to rearrange the position of the CCEs that will be received by the UE 92 to make sure that the resource indices for the UE 92 are in one RB.

The resource indices are DRS indices or ACK/NACK indices.

The base station 91 may further include a recording unit 912 which is configured to record the resource indices for the UE 92.

The base station 91 may further include a sending unit 913 which is configured to send the CCEs to the UE 92 via a downlink control channel.

Figure 11:
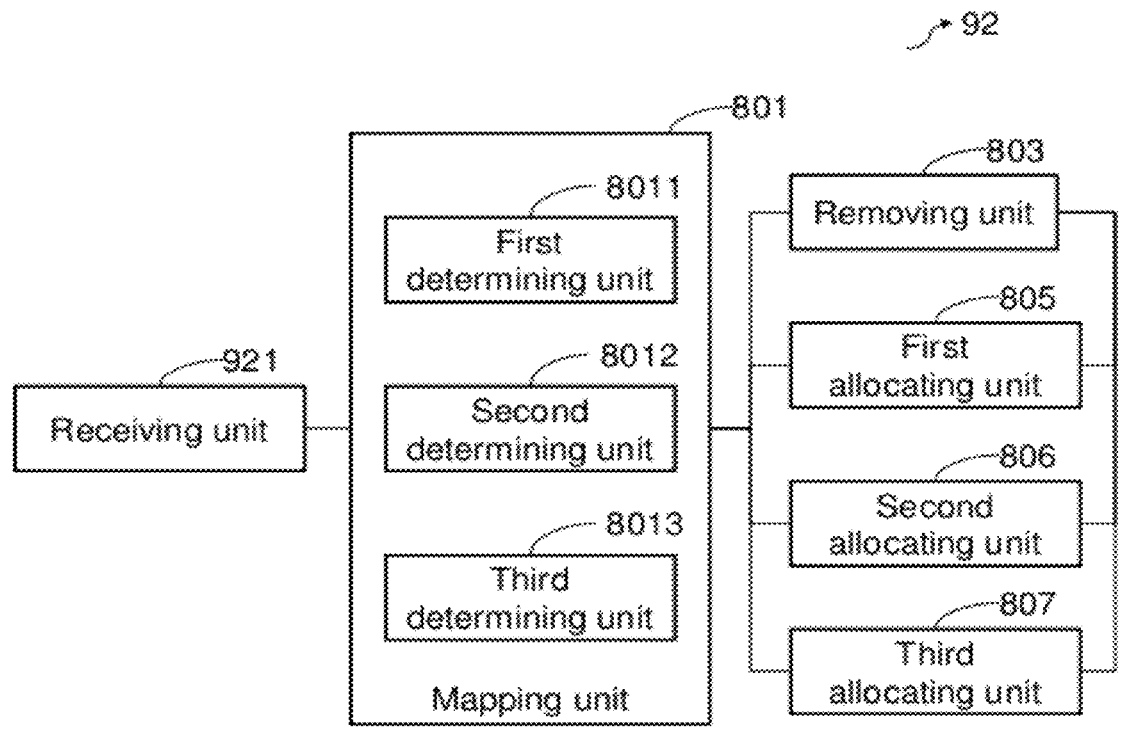
FIG. 11 is an architecture diagram of a base station of one embodiment of the present invention.

With reference to FIG. 11, the UE 92 may further include a mapping unit 801 is configured to map at least two CCEs for the UE 92 to at least two resource indices for the UE 92 according to a predetermined mapping rule.

The UE 92 may further include a receiving unit 921 configured to receives the at least two CCEs from the base station 91.

The mapping unit 801 may further include at least one following unit: a first determining unit 8011, a second determining unit 8012, and a third determining unit 8013.

The first determining unit 8011 is configured to determine at least two resource indices for the UE 92, and each resource index is determined according to $$\mod(s+m, K)+a$$

where s is the first CCE index of the UE 92, m is an offset, where $m \geq 0$, K is the number of available resource indices within one RB, and a is a value between 0 and N-1, where N is the number of CCEs for the UE 92.

The second determining unit 8012 is configured to determine at least two resource indices for the UE 92, and each resource index is determined according to $$\begin{cases} s+m+a & \text{if } s+m < K^{re} \\ \mod(s+m-K^{re}, K)+a & \text{if } s+m \geq K^{re} \end{cases}$$

where s is the first CCE index of the UE 92, m is an offset, where $m \geq 0$, a is a value between 0 and N-1, where N is the number of CCEs for the UE 92, $K^{re}$ is the number of available resources indices in the first RB, and K is the number of available resources indices within a second RB.

The third determining unit 8013, configured to determine at least two resource indices for the UE 92, and each resource index is determined according to $$s+m-\sum_{m=0}^{n-1} K^m + a, \text{ where } \sum_{m=0}^{n-1} K^m < s+m \leq \sum_{m=0}^{n} K^m$$

where s is the first CCE index of the UE 92, m is an offset, where $m \geq 0$, and $K^m$ is the number of available resource indices in the $RB_m$, where m=0, 1, ... M-1, where M is the number of available RBs for resource indices, a is a value between 0 and N-1, where N is the number of CCEs for the UE 92, and n is the RB index for the UE 92.

If at least one of the determined resource indices for the UE 92 exceeds the number of available resource indices in one RB, the UE 92 may further include a removing unit 803.

The removing unit 803 is configured to remove the at least one of the determined resource indices.

The resource indices are DRS indices or ACK/NACK indices.

The UE 92 may further include a first allocating unit 805 and/or a second allocating unit 806.

The first allocating unit 805 is configured to allocate one determined DRS index for each logical antenna if the UE 92 has multiple logical antennas.

The second allocating unit 806 is configured to allocate at least two determined ACK/NACK indices for one logical antenna.

The UE 92 may further include a third allocating unit 807 configured to allocate at least one determined ACK/NACK index for one logical antenna.

According to the embodiment of the present invention we can see that the system 90 can determine multiple resource indices for the UE 92 implicitly because it maps the CCEs to at least two resource indices for the UE 92 according to predetermined mapping rule. The system 90 can determine at least two resource indices for the UE 92 if the number of available resource indices in each RB is the same, or if the number of available resource indices in the first RB is less than the number of available resource indices in other RBs, or if the number of available resource indices in each RB is different. The system 90 can avoid some unavailable resource indices for the UE 92 which exceeds the number of available resource indices in one RB. If the UE 92 has multiple logical antennas, after allocating at least two different DRS indices to at least two different logical antennas, the UE 92 can transmit uplink data via different logical antenna. This will improve the uplink performance of the UE 92 through transmit diversity especially when it is a cell edge UE. Furthermore, after allocating at least two ACK/NACK indices for one logical antenna, the UE 92 can transmit uplink data through code or spatial multiplexing via the logical antenna. This will increase the uplink information transmission capacity through code or spatial multiplexing.

Some detailed embodiments are given to make the present invention clearer.

One detailed embodiment is assumed that every RB used to transmit uplink information has same number of resource indices, c=3 and $\Delta_{shift}=2$, and the total number of resource indices available within one RB is K=12*3/2=18 according to the formula (4), which is numbered as 0, 1, . . . , 17. In this example, there are five UEs receiving PDCCH from a base station.

1. The base station allocates a number of CCEs to each UE.

The base station schedules each UE by allocating a particular number of CCEs in relation to Channel Quality Information and amount of control information to be transmitted in downlink direction for the UE.

The 5 UEs are allocated PDCCH consisting of 1, 1, 2, 4 and 8 CCEs, respectively.

Figure 12:
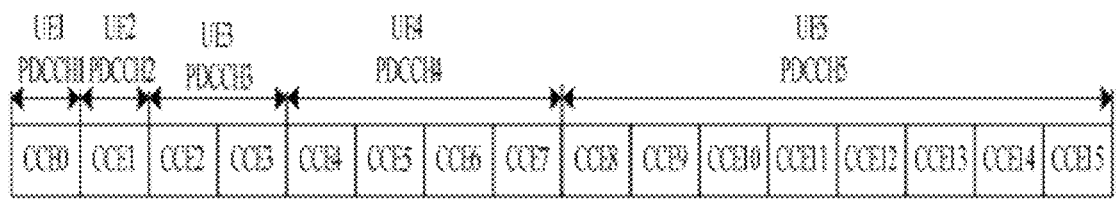
FIG. 12 is a schematic diagram of the mapping of CCEs to PDCCH of one detailed embodiment of the present invention.

The mapping of CCEs to PDCCH is shown in FIG. 12.

2. The base station maps the CCE to resource index for each UE. If a UE has more than one CCEs, the base station maps the CCEs to at least two resource indices for the UE according to a predetermined mapping rule.

If the broadcast offset information m equals 1, every UE has same RB index 0 according to formula (3). The DRS indices for each UE could be determined according to formula (2): Zd1={1}, Zd2={2}, Zd3={3,4}, Zd4={5,6,7,8}, Zd5={9,10,11,12,13,14,15,16}.

The ACK/NACK indices for each UE could be determined according to formula(2):

Za1={1}, Za2={2}, Za3={3,4}, Za4={5,6,7,8}, Za5={9,10,11,12,13,14,15,16}.

In this embodiment, the base station maps all the resource indices for each UE.

The base station may record the RB index, DRS indices and ACK/NACK indices of each UE.

3. The base station may send the CCEs as showed in FIG. ? to each UE via a downlink control channel.

4. The UE4 with two logical antennas receives its CCEs for it from the control channel.

5. The UE4 maps its CCEs to at least two resource indices according to a predetermined mapping rule.

The UE4 finds its CCE indices {4, 5, 6, 7} according to the positions of its CCEs in the CCE sequence.

The UE4 maps its CCE indices to at least two resource indices according to a predetermined mapping rule.

Because the broadcast offset information m equals 1, the UE4 can determine its RB index 0 according to formula (3). It just maps two DRS indices {6, 8} according to formula (2) from a part of its CCE indices {5, 7 }, and it determines its 4 ACK/NACK indices {5,6,7,8} according to formula (2).

6. After determining its resource indices, The UE4 uses the RB index, DRS indices and ACK/NACK indices to transmit the uplink information.

It allocates the RB index 0, DRS index 6 and ACK/NACK indices {5,6} to the first logical antenna; the RB index 0, DRS index 8 and ACK/NACK indices {7,8}to the second logical antenna.

The UE4 can transmit control information to a base station via different logical antennas because different logical antennas have a different determined DRS index, and can also transmit data through code or spatial multiplexing via the logical antenna because one logical antenna has two determined ACK/NACK indices.

One detailed embodiment is assumed again that c=3 and $\Delta_{shift}$=2, the total number of resource indices within one RB is K=12*3/2=18 according to formula (4), which is numbered as 0, 1, . . . , 17. Furthermore there are two RBs used for PUCCH ACK/ANCK transmission, where the first RB only has 6 resource indices, so Kre=6, and the second RB has 18 resource indices. In this example, there are six UEs receiving PDCCH from a base station.

1. The base station allocates a number of CCEs to each UE.

The base station schedules each UE by allocating a particular number of CCEs in relation to Channel Quality Information and amount of control information to be transmitted in downlink direction for the UE.

The 6 UEs are allocated PDCCH consisting of 2,2,2,2,4 and 4CCEs respectively.

Figure 13:
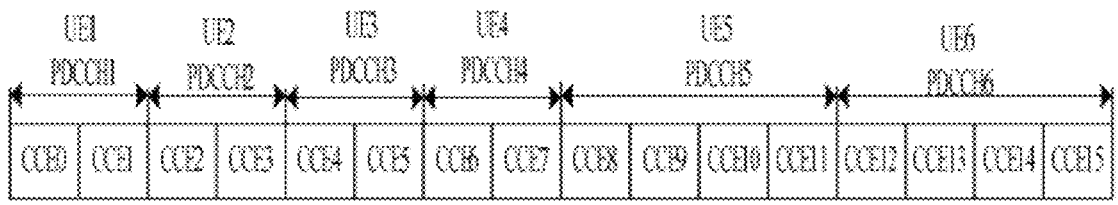
FIG. 13 is a schematic diagram of the mapping of CCEs to PDCCH of another detailed embodiment of the present invention.

The mapping of CCEs to PDCCH is shown in FIG. 13.

2. The base station maps the CCE to resource index for each UE. If a UE has more than one CCEs, the base station maps the CCEs to at least two resource indices for the UE according to a predetermined mapping rule.

If the broadcast offset information m equals 0, UE1, UE2, UE3 have same RB index 0 and UE4, UE5, UE6 have same RB index 1 according to formula (6). The DRS indices for UE1, UE2, UE3, UE4, UE5, UE6 could be determined according to formula (5): Zd1={0,1}, Zd2={2,3}, Zd3={4, 5}, Zd4={0,1}, Zd5={2,3,4,5}, Zd6={6,7,8,9}.

The ACK/NACK indices for each UE could be determined according to formula(5):

Za1={0,1}, Za2={2,3}, Za3={4,5}, Za4={0,1}, Za5={2,3,4,5}, Za6={6,7,8,9}.

In this embodiment, the base station maps all the resource indices for each UE.

The base station may record the RB index, DRS indices and ACK/NACK indices of each UE.

3. The base station may send the CCEs as showed in FIG. 13 to each UE via a downlink control channel.

4. The UE6 with three logical antennas receives its CCEs for it from the control channel.

5. The UE6 maps its CCEs to at least two resource indices according to a predetermined mapping rule.

The UE6 finds its CCE indices {12, 13, 14, 15} according to the positions of its CCEs in the CCE sequence.

The UE6 maps its CCE indices to at least two resource indices according to a predetermined mapping rule.

Because the broadcast offset information m equals 0 and Kre=6, the UE6 can determine its RB index 1 according to formula (6). It just maps two DRS indices {6, 7} according to formula (5) from a part of its CCE indices {12, 13}, and it also just maps two ACK/NACK indices {7, 9} according to formula (5) from a part of its CCE indices {13, 15}.

6. After determining its resource indices, The UE6 uses the RB index, DRS indices and ACK/NACK indices to transmit the uplink information.

It allocates the RB index 1, DRS index 6 and ACK/NACK indices 7 to the second logical antenna; the RB index 1, DRS index 7 and ACK/NACK indices 9 to the second logical antenna.

The UE4 can transmit control information to a base station via different logical antennas because at least two different logical antennas have a different determined DRS index.

One detailed embodiment shows a case using the exception, i.e. there is a resource indices allocation problem for one of the UEs. Assume that each RB used to transmit uplink information has same number of resource indices, c=3 and $\Delta_{shift}$=3, and the total number of resource indices available within one RB is K=12*3/3=12 according to the formula (4), which is numbered as 0, 1, . . . , 11. In this example, there are four UEs receiving PDCCH from a base station.

1. The base station allocates a number of CCEs to each UE.

The base station schedules each UE by allocating a particular number of CCEs in relation to Channel Quality Information and amount of control information to be transmitted in downlink direction for the UE.

The 4 UEs are allocated PDCCH consisting of 2, 2, 4 and 4 CCEs respectively.

Figure 14:
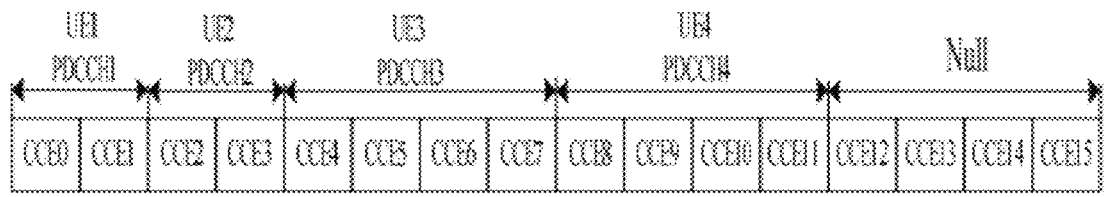
FIG. 14 is a schematic diagram of the mapping of CCEs to PDCCH before rearranging of one detailed embodiment of the present invention.

The mapping of CCEs to PDCCH is shown in FIG. 14.

2. The base station maps the CCE to resource index for each UE. If a UE has more than one CCEs, the base station maps the CCEs to at least two resource indices for the UE according to a predetermined mapping rule.

If the broadcast offset information m equals 2, every UE has same RB index 0 according to formula (3). The DRS indices for each UE could be determined according to formula (2): $Z_{d1}$={2,3}, $Z_{d2}$={4,5}, $Z_{d3}$={6,7,8,9}, $Z_{d4}$={10,11,12,13}.

The ACK/NACK indices for each UE could be determined according to formula(2):

$Z_{a1}$={2,3}, $Z_{a2}$={4,5}, $Z_{a3}$={6,7,8,9}, $Z_{a4}$={10,11,12, 13}.

In this embodiment, the base station maps all the resource indices for each UE.

It can be observed that two DRS {12, 13} allocated for UE4 exceed the range of DRS within one RB (since there are only 12 DRSs). The ACK/NACK indices for UE4 also have this problem.

When this case occurred, the determined DRS for UE4 would be Zd4={10,11} and ACK/NACK indices for UE4 would be Za4={10,11} according to the first exception solution.

Figure 15:
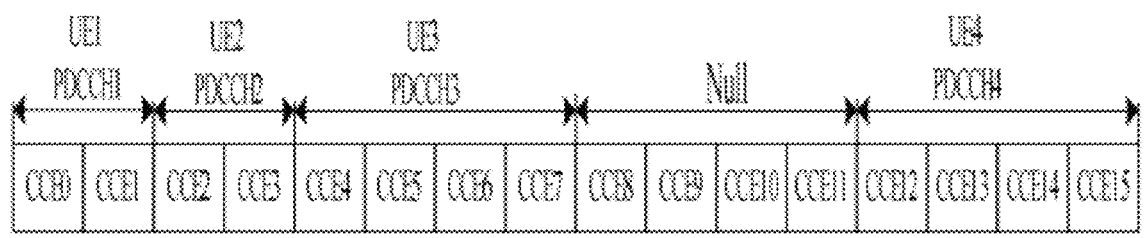
FIG. 15 is a schematic diagram of the mapping of CCEs to PDCCH after rearranging of one detailed embodiment of the present invention.

In another way, the base station can rearrange the CCEs for UE4 to avoid the problem. This is exception solution 2. For example, the mapping of CCE to PDCCH could be changed to what is shown in FIG. 15, In this case, the RB index for UE4 would be 1; the DRS determined for UE4 would be Zd4={2,3,4,5},and the ACK/NACK indices for UE4 would be Za4={2,3,4,5}. The PUCCH for UE4 will be transmitted in the second RB.

The base station may record the RB index, DRS indices and ACK/NACK indices of each UE.

3. The base station may send the CCEs as showed in FIG. ? to each UE via a downlink control channel.

4. The UE4 with two logical antennas receives its CCEs for it from the control channel.

5. The UE4 maps its CCEs to at least two resource indices according to a predetermined mapping rule.

The UE4 finds its CCE indices {12,13,14,15} according to the positions of its CCEs in the CCE sequence.

The UE4 maps its CCE indices to at least two resource indices according to a predetermined mapping rule.

Because the broadcast offset information m equals 2, the UE4 can determine its RB index 1 according to formula (3). It just maps three DRS indices {2,3,5} according to formula (2) from a part of its CCE indices {12,13,15}, and it determines its 4 ACK/NACK indices {2,3,4,5} according to formula (2).

6. After determining its resource indices, The UE4 uses the RB index, DRS indices and ACK/NACK indices to transmit the uplink information.

It allocates the RB index 1, DRS index {2,5} and ACK/NACK indices {4,5} to the first logical antenna; the RB index 1, DRS index 3 and ACK/NACK indices {2,3}to the second logical antenna.

The UE4 can transmit control information to a base station via different logical antennas because different logical antennas have a different determined DRS index, and can also transmit data through code or spatial multiplexing via the logical antenna because one logical antenna has two determined ACK/NACK indices.

Figure 16:
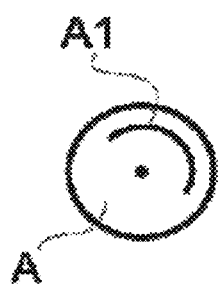
FIG. 16 is a schematic and very simplified illustration of a compact disc carrying computer program code according to the present invention.

Embodiments within the scope of the present invention also include a computer program product with computer program code A1, schematically shown in FIG. 16, which, when executed by a computer, will enable the computer to perform the steps of the above described inventive method. Specifically, the present invention relates to a computer program product with computer program code Al which, when executed, will enable a base station or a user equipment to perform the steps of the inventive method described above. The present invention also relates to a computer readable medium A for carrying or having computer program code Al according to the invention, such as computer-executable code, computer-executable instructions, computer-readable instructions, or data structures, stored thereon. Such computer readable medium may be any available medium, which is accessible by a general-purpose or special-purpose computer system. By way of example, and not limitation, such computer-readable medium can comprise physical storage media such as RAM, ROM, or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. FIG. 16 illustrates the computer readable medium as a compact disc.

The embodiments as well as the features of such embodiments described above can be combined if they do not exclude each other.

It will be understood that the invention is not restricted to the aforedescribed and illustrated exemplifying embodiments thereof and that modifications can be made within the scope of the inventive concept as illustrated in the accompanying claims.

What is claimed is:

1. A method for determining a resource index in a wireless communication system, comprising: mapping, by a user equipment (UE) having multiple logical antennas, at least two control channel elements (CCEs) for the UE to at least two demodulation reference signal (DRS) indices the UE according to a predetermined mapping rule; allocating, by the UE, one of determined demodulation reference signal (DRS) index for each logical antenna; transmitting, by the UE, the allocated demodulation reference signal (DRS) index from each logical antenna; mapping, by the UE, the at least two CCEs for the UE to at least two ACK/NACK indices for the UE according to a predetermined mapping rule; and allocating, by the UE, at least one of determined ACK/NACK indices for each logical antenna;

transmitting, by the UE, the at least one allocated ACK/NACK index from each logical antenna.

2. The method according to claim 1, further comprising: establishing the at least two CCEs for the UE.

3. The method according to claim 1, further comprising at least one of the following:

removing at least one of the determined DRS indices for the UE when the number of the determined DRS indices for the UE exceeds the number of available DRS indices in one resource block (RB); or removing at least one of the determined ACK/NACK indices for the UE when the number of the determined ACK/NACK indices for the UE exceeds the number of available ACK/NACK indices in one resource block (RB).

4. The method according to claim 1, further comprising:

rearranging the position of the CCEs to position the resource indices for the UE in one RB when at least one of the resource indices exceeds the number of available resource indices in one resource block (RB).

5. The method according to claim 1, wherein the mapping according to the predetermined mapping rule further comprises:

determining at least two resource indices for the UE, wherein each resource index is determined according to $$\mod(s+m,K)+a$$

where mod is a modulo operator, s is the first CCE index for the UE, m is an offset, where $m \geq 0$, K is the number of available resource indices within one resource block (RB), and a is a value between 0 and N-1, where N is the number of CCEs for the UE.

6. A user equipment (UE) for determining a resource index in a wireless communication system, comprising: a first mapping unit, configured to map at least two control channel elements (CCEs) for the UE to at least two demodulation reference signals (DRS) indices for the UE according to a predetermined mapping rule, and a second mapping unit, configured to map the at least two control channel elements (CCEs) for the UE to at least two ACK/NACK indices for the UE according to a predetermined mapping rule; wherein the UE has multiple logical antennas, the UE further comprises: a first allocating unit, configured to allocate one determined demodulation reference signal (DRS) index for each logical antenna, and a second allocating unit, configured to allocate at least one of determined ACK/NACK indices for each logical antenna; wherein the UE transmits from each logical antenna the allocated demodulation reference signal (DRS) index and the at least one allocated ACK/NACK index.

7. The UE according to claim 6, wherein the UE further comprises:
an establishing unit, configured to establish the at least two CCEs for the UE.

8. The UE according to claim 6, wherein the mapping unit is further configured to determine at least two resource indices for the UE, wherein each resource index is determined according to mod(s +m,K)+a where mod is a modulo operator, s is the first CCE index for the UE, m is an offset, where m ≧0, K is the number of available resource indices within one resource block (RB), and a is a value between 0 and N-1, where N is the number of CCEs for the UE.

9. An apparatus comprising a processor configured to execute computer-executable instructions to determine a resource index in a wireless communication system, wherein the instructions comprise instructions for: mapping at least two control channel elements (CCEs) for a UE having multiple logical antennas to at least two demodulation reference signal (DRS) indices for the UE according to a predetermined mapping rule; allocating one determined demodulation reference signals (DRS) index for each logical antenna; transmitting the allocated demodulation reference signal (DRS) index from each logical antenna; mapping, by the UE, the at least two CCEs for the UE to at least two ACK/NACK indices for the UE according to a predetermined mapping rule; and allocating, by the UE, at least one of determined ACK/NACK indices for each logical antenna; transmitting the at least one allocated ACK/NACK index from each logical antenna.

10. The apparatus according to claim 9, wherein the mapping according to the predetermined mapping rule further comprises:
determining at least two resource indices for the UE, wherein each resource index is determined according to mod(s +m,K)+a where mod is a modulo operator, s is the first CCE index of the UE, m is an offset, where m ≧0, K is the number of available resource indices within one resource block, RB, and a is a value between 0 and N-1, where N is the number of CCEs for the UE.

11. A computer program product for storing instructions operable in a user equipment (UE) having at least two logical antennas, comprising a non-transitory computer-readable medium comprising: code for causing a computer to generate a signal to cause mapping of at least two control channel elements (CCEs) for the UE to at least two demodulation reference signal (DRS) indices for the UE according to a predetermined mapping rule; code for causing a computer to allocate one of determined demodulation reference signal (DRS) index for each logical antenna; codes for causing a computer to transmit the allocated demodulation reference signal (DRS) index from each logical antenna; code for causing a computer to generate a signal to cause mapping of the at least two CCEs for the UE to at least two ACK/NACK indices for the UE according to a predetermined mapping rule; and code for causing a computer to allocate at least one of determined ACK/NACK indices for each logical antenna; codes for causing a computer to transmit the at least one allocated ACK/NACK index from each logical antenna.

12. The computer program product according to claim 11, further comprising
code for causing a computer to establish the at least two CCEs for the UE.

13. The computer program product according to claim 11, wherein the mapping according to the predetermined mapping rule further comprises:
determining at least two resource indices for the UE, wherein each resource index is determined according to mod(s +m,K)+a where mod is a modulo operator, s is the first CCE index for the UE, m is an offset, where m ≧0, K is the number of available resource indices within one resource block (RB), and a is a value between 0 and N-1, where N is the number of CCEs for the UE.

* * * * *